United States Patent Office 3,850,858
Patented Nov. 26, 1974

3,850,858
HOT MELT PRESSURE SENSITIVE ADHESIVES
Vernon K. Park, Longview, Tex., assignor to Eastman Kodak Company, Rochester, N.Y.
No Drawing. Filed Sept. 28, 1973, Ser. No. 401,741
Int. Cl. C08f 15/00, 19/00
U.S. Cl. 260—27 BB        12 Claims

ABSTRACT OF THE DISCLOSURE

The hot melt pressure sensitive adhesives of the present invention are a blend comprising amorphous polyolefin, rubbery block copolymers of styrene and butadiene or styrene and isoprene, polybutylene, polyisobutylene, a tackifying resin, and crystalline polypropylene. This pressure sensitive adhesive has a novel combination of properties including good adhesive properties at both high and low temperatures.

---

This invention relates to hot melt pressure sensitive adhesives. One aspect of this invention concerns a hot melt pressure sensitive adhesive having a novel combination of properties. Another aspect of this invention concerns a pressure sensitive adhesive that has good cohesive and adhesive properties over a wide range of temperatures.

Pressure sensitive adhesives that have good tack and adhere to numerous substrates are widely used in industry for various applications such as in product assembly. For example, one such application is in the automotive industry. The automotive industry uses solvent based pressure sensitive adhesives to adhere a rubber weather-strip around automobile trunk decks, to adhere carpets to the painted surfaces of automobile floors, and to bond vinyl covers to automobile metal roofs. Although these solvent based pressure sensitive adhesives provide adequate adhesive properties, they have the disadvantages of requiring a double application of adhesive, i.e., a priming application and a final application, as well as solvent removal which is both time consuming and presents pollution problems. Therefore, it would be desirable to have a hot melt pressure sensitive adhesive that has both high temperature and low temperature balance of adhesive properties without the disadvantages associated with solvent based adhesives.

It is, therefore, an object of the present invention to provide a novel pressure sensitive adhesive.

Another object of this invention is provide a pressure sensitive adhesive that has a good balance of properties including both good high temperature and low temperature adhesive properties.

A further object of the present invention is to provide an adhesive which has excellent adhesion to rubber and painted metal surfaces.

Another and further object of this invention is to provide an adhesive having good adhesion properties which can be applied without the use of a solvent.

In accordance with the present invention we have found that a blend comprising amorphous polyolefin, rubbery block copolymers of styrene and butadiene or styrene and isoprene, polybutylene, polyisobutylene, a tackifying resin, and crystalline polypropylene provides a hot melt pressure sensitive adhesive which can be applied without solvents and has a novel combination of properties including good adhesive properties at both high and low temperature.

The amorphous polyolefin, useful in this invention, is an essentially noncrystalline hexane soluble polyolefin, such as amorphous polypropylene, formed in minor amounts during the production of crystalline polypropylene by the polymerization of propylene in the presence of stereospecific catalysts by a process as disclosed in U.S. Pat. 3,679,775, incorporated herein by reference. The solid amorphous polypropylene has a viscosity of about 1,000 to about 50,000 centipoise (190° C.—Brookfield) and preferably from about 3,000 to about 15,000 centipoise. The amorphous polyolefin can contain crystalline hexane insoluble polyolefin up to an amount of about 30 weight percent. One such commercially available amorphous polyolefin useful in the present adhesives is "Eastobond" M-5 available from Eastman Chemical Products, Inc. The amorphous polypropylene component is contained in the adhesive compositions of this invention in an amount of about 30 percent to about 60 percent by weight and preferably about 45 percent to about 55 percent by weight. The amorphous polyolefin component can also be an amorphous hexane soluble propylene-alpha-monoolefinic copolymer. These amorphous copolymers are formed in varying amounts during the production of crystalline propylene-alpha-monoolefinic copolymers by stereospecific polymerization of propylene and a different alpha-monoolefin by a process as disclosed in U.S. Pat. 3,529,037, incorporated herein by reference. These amorphous copolymers can also contain various amounts of hexane insoluble polymer up to an amount of about 30 weight percent. These amorphous polymers can also be produced directly, i.e., without production of crystalline copolymer, by stereospecific polymerization by polymerizing a mixture of propylene and butene-1 in mineral spirits at a temperature of 140° C. to 250° C. and a pressure in the range of about atmospheric to about 2,000 p.s.i.g. with the catalyst containing an organopolylithium aluminum compound and the HA form of titanium trichloride in a mole ratio of 0.01–0.05/0.1–1.0/1 by a polymerization process as disclosed in U.S. Pat. 3,679,775 which disclosure is incorporated herein by reference. Methods of preparation of the organopolylithium aluminum compounds are also disclosed in U.S. Pat. 3,679,775. One example of amorphous copolymers useful in the present invention is amorphous propylene-butene copolymers containing from about 30 percent to about 75 weight percent of butene-1, and having a melt viscosity of about 100 to 100,000 centipoise at 190° C., a solubility in refluxing hexane of at least 99 weight percent, a solubility in refluxing diethyl ether of at least 60 weight percent, a ring and ball softening point in the range of about 78 to 120° C. and a Differential Scanning Calorimeter melting point not greater than 120° C.

The rubbery block copolymers of styrene and butadiene or styrene and isoprene that are especially useful in this invention are composed of blocks or groups of polymonomers such as blocks of polystyrene and polyisoprene or polystyrene and polybutadiene. The polystyrene groups have molecular weights of from about 5,000 to about 125,000, preferably between about 8,000 and 45,000; the polybutadiene or polyisoprene blocks have molecular weights of between about 15,000 and about 250,000, preferably from about 35,000 to about 150,000. Such copolymers can contain from about 20% to about 80% of either block polymer. One such commercially available copolymer is "Kraton" available from Shell Chemical Company. For example, Kraton 1107, which is a polystyrene-polyisoprene-polystyrene (S-I-S) copolymer, and Kraton 1102, which is a polystyrene-polybutadiene-polystyrene (S-B-S) copolymer, are both particularly useful in the present invention. These rubbery block copolymers can be used in amounts of about 10 percent to about 30 percent by weight of the adhesive composition, preferably about 15 percent to about 20 percent by weight. One of these rubbery block copolymers or mixtures of such rubbery block copolymers can be used in preparing the adhesives of the present invention.

Another component of the adhesive compositions of this invention is low molecular weight polybutylenes which are polymers composed predominantly of monoolefins having four carbon atoms (85 percent to 98 percent by weight), the balance being isoparaffins. The molecular weight of the polybutene should be in the range of about 300–3000 (as determined by Microlab Osmometer). Such polymers, which are particularly useful in the invention, and commercially available under the trade name "Indopol" from Amoco Chemicals, are for example, Indopol H–1900 polymers. The polybutylenes can be used in amounts of about 5 percent to 15 percent by weight of the adhesive composition, preferably about 8 percent to about 12 percent by weight.

The polyisobutylenes particularly useful in the adhesive compositions of this invention are highly paraffinic hydrocarbon polymers composed of long straight-chain molecules having terminal unsaturation only. Such polymers are commercially available polyisobutylene under the trade name "Vistanex" from Enjay Chemical Company having a Staudinger molecular weight of 20,000 to 80,000. The preferred isobutylene polymer is butyl rubber. The term "butyl rubber" as used herein is intended to define rubbery copolymers of isobutylene with a diolefin containing 4 to 14 carbon atoms, usually isoprene, but diolefins such as butadiene, dimethyl butadiene and pentadiene may also be used, said copolymers containing 85 to 99.5 parts by weight of the olefin and 15 to 0.5 parts by weight of the diolefin. For example, Vistanex LM–MS and LM–MH which have molecular weights of about 35,000 to about 46,000, respectively, are particularly useful in the adhesive composition of this invention. These polyisobutylenes can be used in amounts of about 5 percent to 15 percent by weight of the adhesive composition, preferably about 8 percent to about 12 percent by weight.

The tackifying resins useful in the adhesive compositions of this invention can be a hydrocarbon resin such as DAC–B hydrocarbon resin prepared according to the process disclosed in U.S. Pat. 3,701,760 as well as other hydrocarbon resins, synthetic polyterpenes, resin esters and the like. One such hydrocarbon tackifying resin is a hydrocarbon resin having a softening point of 130° C. and available commercially as "Easto-Rez" 130 from Eastman Chemical Products, Inc. Other hydrocarbon tackifying resins can be prepared by the polymerization of monomers consisting primarily of olefins and diolefins and include, for example, the residual by-product monomers resulting from the manufacture of isoprene. These hydrocarbon tackifying resins typically exhibit a ball and ring softening point of from about 80 to 125° C.; an acid number of from about 0 to 2; a saponification value of less than about 1; and, an iodine value of from about 75–100. Examples of such commercially available resins of this type are "Wingtack" 95 as sold by the Goodyear Tire and Rubber Co. and the Sta-Tac and Betaprene H resins sold by the Reichhold Chemical Corp.

Also suitable resins are the terpene polymers such as the polymeric, resinous materials including the dimers as well as higher polymers obtained by polymerization and/or copolymerization of terpene hydrocarbons such as the alicyclic, monocyclic, and bicyclic monoterpenes and their mixtures, including allo-ocimene, carene, isomerized pinene, pinene, dipentene, terpinene, terpinolene, limonene, turpentine, a terpene cut or fraction, and various other terpenes. Particularly useful starting materials are terpene mixtures containing at least 20% β-pinene and/or limonene or dipentene (racemic limonene), and the "sulfate turpentine" obtained as a by-product in the sulfate pulping process. Other suitable tackifying resins are the rosin esters which include ethylene glycol, polyethylene glycol, glycerol and pentaerythritol rosin esters, hydrogenated rosin esters or methylated rosin esters, for example, the commercially available materials "Staybelite" Ester 3 triethylene glycol ester of hydrogenated rosin, "Foral" 85 and 105 highly stabilized ester resins of pentaerythritol and rosin base.

The hydrocarbon resins, polyterpenes, and rosin esters can be used either alone or in combination; however, in general, better results are obtained with the rosin esters. These tackifying resins can be used in amounts of about 10 percent to about 30 percent by weight of the adhesive composition, preferably about 15 percent to about 25 percent by weight.

The crystalline, hexane insoluble polypropylenes useful in this invention are produced by the polymerization of propylene in the presence of stereospecific catalysts. One method for preparing these polypropylenes is disclosed in U.S. Pat. 3,679,775. These polypropylenes are predominantly crystalline; however, they may contain a small amount of amorphous polypropylene, i.e., up to about 10 percent by weight. These polypropylenes have inherent viscosities (I.V.) as measured in tetralin at 145° C. of from about 0.5 to 4.0, preferably about 1.0 to 3.0. These crystalline polypropylenes can be used in amounts of about 0.5 percent to about 2.0 percent by weight of the adhesive composition, preferably about 0.75 percent to about 1.5 percent by weight.

The adhesive compositions of this invention are prepared by blending together the six components in the melt at a temperature of about 160° C. to about 200° C. until a homogeneous mixture is obtained. Various methods of blending materials of this type are known to the art and any method that produces a homogeneous mixture is satisfactory. These components blend easily in the melt and a heated vessel equipped with a stirrer is all that is required. For example, a Cowles stirrer provides effective mixing for preparing these compositions. Solvents such as hexane, heptane, mineral spirits, xylene, toluene, benzene, chlorinated hydrocarbons, etc., are not needed to prepare the compositions of this invention; however, they can be used if desired.

In addition to the six components, it is desirable for the adhesive compositions to contain about 0.1 percent to about 1.5 percent by weight, preferably about 0.25 percent to 1.0 percent by weight, of one or more antioxidants. Antioxidants that are effective for the various components, especially the rubbery block copolymer and the amorphous polypropylene, can be used. Such antioxidants include, for example, "Ionox" 220 and 330 [tris-(di - t - butyl - p - hydroxybenzyl)-trimethylbenzene], "Dalpac" 4C2 [6-di(t-butyl)-p-cresol], "Naugawhite" (alkylated bisphenol), "Butyl Zimate" (zinc dibutyl dithiocarbamate), and "Ethyl" 702 [4,4'-methylene bis(2,6-di-tert-butylphenol)].

Additives such as nucleating agents, pigments, colorants, fillers, solvents, and the like can also be added to the adhesive compositions of the present invention.

The adhesive compositions of this invention, which are at least essentially 100 percent solids, have a Thermosel viscosity, Model RVT, in the range of 4,500 to 50,000 centipoise at 190° C. and a softening point (ring and ball—ASTM D 36–26) of at least about 245° F., preferably from about 280° F. to about 310° F.

This invention can be further illustrated by the following examples of preferred embodiments thereof, although it will be understood that these examples are included merely for purposes of illustration and are not intended to limit the scope of the invention unless otherwise specifically indicated.

EXAMPLE 1

A hot melt pressure sensitive adhesive is made in a 2-liter resin flask fitted with an anchor blade stirrer under nitrogen using the following components:

| | |
|---|---|
| 300 grams (50 percent by weight) | Amorphous polypropylene (viscosity=3,000 centipoise at 190° C.) |
| 90 grams (15 percent by weight) | Rosin ester (Foral 105). |
| 88.5 grams (14.75 percent by weight). | Polystyrene-polyisoprene-polystyrene block copolymer (crumb form of Kraton 1107). |
| 60 grams (10 percent by weight) | Polybutylene (Indopol H-1900). |
| 54 grams (10 percent by weight) | Polyisobutylene (vistanex LM–MS). |
| 6 grams (1 percent by weight) | Crystalline polypropylene (inherent viscosity=1.7). |
| 1.5 grams (0.25 percent) | Antioxidant (Ethyl 702). |

The flask is heated with an electric heating mantle to a temperature of 190° C. with stirring. The mixture is blended four hours at 190° C. to obtain a homogeneous mass. The adhesive is then poured into a silicone lined box and allowed to cool. The viscosity is 4,850 centipoise at 190° C.

This adhesive is evaluated by adhering a rubber gasket weatherstrip to an acrylic enamel painted metal panel. The adhesive is placed in a Hot Shot No. 1 glue gun and heated to 325° F. Two beads of adhesive, one 6 inches long and one 2 inches long, and one round spot of adhesive approximately one inch in diameter are applied to the panel. After waiting two minutes the rubber strip of the same length is hand pressed into each bead of adhesive.

Three panels are prepared as above. The samples are then placed in an oven preheated to 165° F. horizontally inverted with the rubber facing down. The effect of heat is observed on all panels during the 20 minute exposure. The movement of adhesive or falling of strips is recorded. If the results are satisfactory, the panels are retested at elevated temperature in increments of 25° F. up to a temperature where the specimen fails. The adhesive passes 240° F.

The tensile strength of the adhesive is measured as follows: Panels are made with 6 one-inch long pieces of weatherstrip pressed into the adhesive. The first weatherstrip piece is pressed into the adhesive after a lapse of one minute. The second, third, etc., pieces are pressed into the adhesive after 1.5, 2, 2.5, 3, and 5 minute periods. Tensile tests of these specimens, after being aged 24 hours at 72° F., are measured on an Instron tensile run at a rate of one inch per minute. These tests are run on duplicate samples and recorded. This product shows a tensile strength averaging 6.0 pounds per inch of pull.

Low Temperature Properties

Panels are prepared the same as for the elevated temperature test. The panels containing the weatherstrip bonded to the panel with the adhesive are exposed at −20° F. for two hours in a cold box. The panels are then taken out and shock spanked immediately after removal from the cold box. The bonds are examined for adhesion, adhesive fracture or brittleness and results are recorded. This adhesive shows good adhesion to the rubber and to the painted metal surface with no adhesive failure.

EXAMPLE 2

A hot melt pressure sensitive adhesive is prepared the same as described in Example 1 except that only amorphous polypropylene, rosin ester (Foral 105), and polystyrene-polyisoprene-polystyrene rubber (Kraton 1107) and antioxidant (Ethyl 702) are used. The amounts used are 69.75 weight percent amorphous polypropylene, 25 weight percent Foral 105, 5 weight percent Kraton 1107, and 0.25 weight percent Ethyl 702 antioxidant.

Testing of this adhesive as described in Example 1 shows the following results.

Tensile Strength, pounds/inch _____ 5.4
Elevated Temperature Resistance _____ Fail at 215° F.
Cold Shock Test at −20° F. _____ Good adhesion. No brittleness. (Pass.)

This example shows good adhesive properties but poor elevated temperature resistance.

EXAMPLE 3

A hot melt pressure sensitive adhesive is prepared in the same manner as described in Example 1 using 69.6 weight percent amorphous polypropylene, 30 weight percent hydrocarbon resin (Wingtack 95), 0.18 weight percent dilauryl 3,3′-thiodipropionate, and 0.18 percent Polygard HR antioxidants. This adhesive shows fair tensile strength but poor elevated temperature and low temperature resistance.

EXAMPLE 4

A hot melt pressure sensitive adhesive is prepared in the same manner as described in Example 1 using 69.75 weight percent amorphous polypropylene, 25.0 weight percent hydrocarbon resin (Wingtack 95), 5 weight percent ethylene-vinyl acetate copolymer (Elvax 460), and 0.25 weight percent Ethyl 702 antioxidant. This adhesive shows poor tensile strength and poor elevated temperature resistance (fails at 215° F.) and poor cold shock resistance.

EXAMPLE 5

Hot melt pressure sensitive adhesives are prepared and evaluated in the same manner as in Example 1. The composition and the results of evaluation as adhesives for adhering a rubber gasket to painted metal are given in Table I. All of these blends are deficient in either elevated temperature or low temperature properties.

TABLE I
[Hot melt pressure sensitive adhesives]

| | Blend number | | | | | | | | |
|---|---|---|---|---|---|---|---|---|---|
| | 1 (control) | 2 | 3 | 4 | 5 | 6 | 7 | 8 | 9 |
| M-5, wt. percent | 50 | 49 | 49 | 69.75 | 65 | 51 | 50 | 50 | 60 |
| Wingtack 95, wt. percent | | 20 | 20 | 15.0 | | | | | |
| Foral 150, wt. percent | 15 | | | | | | | | 15 |
| Elvax 460, wt. percent | | | | | 15 | 15 | 15 | 15 | 5.0 |
| Indopol H-1900, wt. percent | 10 | | | 30 | 15.0 | 10 | 10 | 19 | 10 |
| Vistanex LM-MS, wt. percent | 9.0 | 30 | | | | 9.0 | 9.0 | | 9.0 |
| Crystalline polypropylene, wt. percent | 1.0 | 0.75 | 0.75 | | | | | 19 | |
| Kraton 1107, wt. percent | 14.75 | | | | 1.0 | | 1.0 | 1.0 | 1.0 |
| Bond test, lb./in.: | | | | | | 14.75 | | | |
| 1.0 min | 6.5 | 4.7 | 3.9 | 5.0 | 5.2 | 6.4 | 4.9 | 5.2 | 4.5 |
| 3.0 min | 6.2 | 4.7 | 4.0 | 4.8 | 4.8 | 6.2 | 4.8 | 5.1 | 4.0 |
| 5.0 min | 6.0 | 4.6 | 4.0 | 4.8 | 4.1 | 5.9 | 4.6 | 4.6 | 2.8 |
| Cold shock test at −20° F.: | | | | | | | | | |
| Adhesion | Good | Good | Good | Fair | Fair | Good | Good | Fair | Poor |
| Brittleness | Pass | Pass | Fail | Fail | Fail | Pass | Fail | Fail | Fail |
| Elevated temp. (thermo-resistance): | | | | | | | | | |
| 165° F | do | do | Pass | Pass | Pass | do | Pass | Pass | Pass |
| 190° F | do | do | do | do | do | do | do | do | Do |
| 215° F | do | Fail | Fail | Fail | do | Fail | do | do | fail |
| 240° F | do | | | | Fail | | Fail | Fail | |

EXAMPLE 6

Hot melt pressure sensitive adhesives are prepared in the same manner as described in Example 1 except that hydrocarbon resins (Wingtack 95 and Easto-Rez 130) are used in place of rosin ester (Foral 105). These adhesives produce similar satisfactory results as described in Example 1.

EXAMPLE 7

A hot melt pressure sensitive adhesive is prepared in a 35 gallon steel tank fitted with a Cowles stirrer. To the tank is added 50 pounds of amorphous polypropylene and the tank heated to 180° C. with stirring under a nitrogen purge. After the amorphous polypropylene becomes molten, 15 pounds of rosin ester (Foral 105), 14.75 pounds of polystyrene-polyisoprene-polystyrene block copolymer (Kraton 1107), 10 pounds of polybutylene (Indopol H-1900), 9 pounds of polyisobutylene (Vistanex LM-MS), one pound of crystalline polypropylene, and 0.25 pound of tris(di - t - butyl-p-hydroxybenzyl) - trimethylbenzene (Ionox 330) are added. The mixture is blended at 180° C. at a speed of 1,000 r.p.m. for 30 minutes. Viscosity of the adhesive is 5,200 centipoise at 190° C. and ring and ball softening point is 130° C.

This hot melt pressure sensitive adhesive is used to seal the rubber gasket around the trunk deck of an automobile. A good bond is formed between the rubber gasket and the painted acrylic enamel metal body as evidenced by no water leaks showing up in a washing operation.

Although the invention has been described in considerable detail with particular reference to certain preferred embodiments thereof, variations and modifications can be effected within the spirit and scope of the invention.

I claim:

1. An adhesive composition capable of being used as a hot melt pressure sensitive adhesive comprising a blend of (1) 30 to 60 weight percent amorphous polyolefin, (2) 10 to 30 weight percent of at least one tackifying resin selected from the group consisting of hydrocarbon resins, polyterpene resins and rosin esters, (3) 10 to 30 weight percent rubbery block copolymers of styrene and butadiene or styrene and isoprene, (4) 5 to 15 weight percent low molecular weight polybutylene, (5) 5 to 15 weight percent polyisobutylene and (6) 0.5 to 2 weight percent crystalline polypropylene.

2. An adhesive composition according to Claim 1 wherein said amorphous polyolefin is amorphous polypropylene.

3. An adhesive composition according to Claim 2 wherein said tackifying resin is hydrocarbon resin.

4. An adhesive composition according to Claim 3 wherein said polyisobutylene has a molecular weight of from 35,000 to 46,000.

5. An adhesive composition according to Claim 4 wherein said polybutylene are polymers composed predominantly of monoolefins having four carbon atoms (85 percent to 98 percent by weight), the remainder being isoparaffins.

6. An adhesive composition according to Claim 5 wherein said crystalline polypropylene has an inherent viscosity was measured in tetralin of 0.5 to 4.0.

7. An adhesive composition capable of being used as a hot melt pressure sensitive adhesive comprising a blend of (1) 45 to 55 weight percent amorphous polyolefin selected from the group consisting of amorphous polypropylene and amorphous propylene containing block copolymer, (2) 15 to 25 weight percent of at least one tackifying resin selected from the group consisting of hydrocarbon resins, polyterpene resins and rosin ester, (3) 15 to 20 weight percent rubbery block copolymers of styrene and butadiene or styrene and isoprene, (4) 8 to 12 weight percent low molecular weight polybutylene, (5) 8 to 12 weight percent polyisobutylene and (6) 0.75 to 1.5 weight percent crystalline polypropylene.

8. An adhesive composition according to Claim 7 wherein said amorphous polyolefin is amorphous polypropylene.

9. An adhesive composition according to Claim 8 wherein said tackifying resin is hydrocarbon resin.

10. An adhesive composition according to Claim 9 wherein said polyisobutylene has a molecular weight of about 35,000 to 46,000.

11. An adhesive composition according to Claim 10 wherein said polybutylenes are polymers composed predominantly of monoolefins having four carbon atoms (85 percent to 98 percent by weight), the remainder being isoparaffins.

12. An adhesive composition according to Claim 11 wherein said crystalline polypropylene has an inherent viscosity as measured in tetralin at 145° C. of from 1.0 to 3.0.

References Cited

UNITED STATES PATENTS

| | | | |
|---|---|---|---|
| 3,519,585 | 7/1970 | Miller | 260—876 B |
| 3,630,980 | 12/1971 | Russell | 260—876 B |
| 3,686,107 | 8/1972 | Russell | 260—27 BB |
| 3,736,281 | 5/1973 | Russell | 260—876 B |
| 3,787,531 | 1/1974 | Dahlquist | 260—27 BB |
| 3,801,531 | 4/1974 | Berejka | 260—27 BB |

PAUL LIEBERMAN, Primary Examiner

U.S. Cl. X.R.

161—242, 252, 253; 260—45.7 S, 45.95, 876 B, 878 B, 880 B